March 11, 1969    M. GARNIER    3,432,194
DEVICE FOR ATTACHING A DENTAL HAND TOOL OF THE SLIP JOINT TYPE
Filed Jan. 24, 1967

United States Patent Office 3,432,194
Patented Mar. 11, 1969

3,432,194
DEVICE FOR ATTACHING A DENTAL HAND TOOL OF THE SLIP JOINT TYPE
Marcel Garnier, Besancon, Doubs, France, assignor to Micro-Mega, Besancon, Doubs, France
Filed Jan. 24, 1967, Ser. No. 611,448
Claims priority, application France, Feb. 7, 1966, 48,649
U.S. Cl. 287—119
Int. Cl. F16b 7/00; F16d 1/00; F16l 21/00
4 Claims

ABSTRACT OF THE DISCLOSURE

Device for connecting a dental handpiece of the slip joint type in which the slip socket has a longitudinal spring fitting in a groove and has near its extremity a stub adapted to cooperate with an annular groove provided inside the bore of the rear socket of the handpiece to cause an engagement during longitudinal displacement, a button rigid with the socket-slip being able to lower the longitudinal spring in the groove in order to lower the stub in such a way as to permit the disengagement of the handpiece.

---

The invention is concerned with a new hooking device for a dental hand piece of the slip joint type. Hand pieces up to now generally attach on the rear or "coupling" joints, by means of a hook mounted elastically on the male or slip socket of a coupling joint known as a "wrist joint."

These prior art devices have a certain number of drawbacks. The securing hook protrudes and interferes with the grasping of the hand piece. The body of the hand piece must then be counter sunk to permit the passage of the hook, this counter sinking producing in its turn deformations of the body. Moreover, the assembly can only be mounted in a single position of the piece with respect to the wrist joint, which increases the difficulty of assembly thus causing a loss of time and risks of error. The elastic assembly is often rather fragile and the spring can be broken by placing too much pressure on the hook.

The invention proposes to provide a hooking device for a dental hand piece of the slip joint type which avoids the above mentioned drawbacks.

To this effect, the invention is characterized in that the slip socket bears a longitudinal spring lodged in a groove and comprising near its extremity a stub adapted to co-operate with an annular groove provided inside the bore of the rear socket of the hand piece in order to produce a catch by longitudinal movement, a button on the slip socket being able to lower the longitudinal spring into the groove in order to lower the stub in such a way as to permit the freeing of the hand piece.

The invention will be better understood by reference to the following description made by way of non-limiting example and to the accompanying drawing in which.

Figure 1:
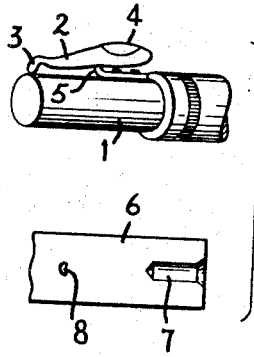
FIGURE 1 is a perspective schematic view of a known hooking device.
Figure 2:
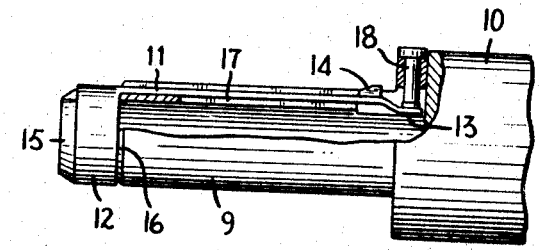
FIGURE 2 is a schematic view, partially in cross-section and partially in elevation, of the extremity of the slip socket according to the invention.
Figure 4:
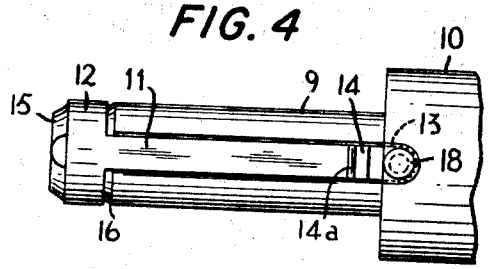
FIGURE 4 is a plan view of the extremity of the socket of FIGURE 2.
Figure 3:
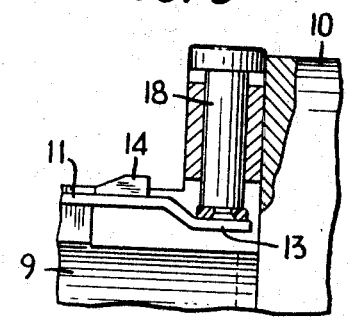
FIGURE 3 is an enlarged view of a detail of FIGURE 2.
Figure 5:
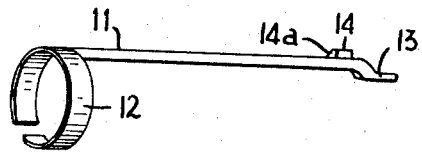
FIGURE 5 is a schematic perspective view of a spring.
Figure 6:
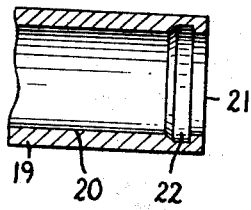
FIGURE 6 is a cross-sectional view of the extremity of the rear socket of a hand piece according to the invention.
Figure 7:
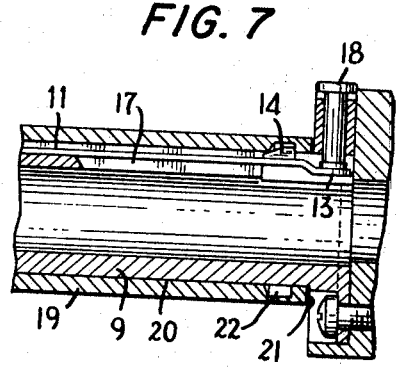
FIGURE 7 shows cross-sectionally the structural relationship existing between the elements comprising the assembly according to the invention.

Reference is first made to FIGURE 1 which represents an attaching device of conventional design. The slip socket 1 at the extremity of the driving member, classical wrist joint or small motor for direct driving, bears a hook 2 with a curved extremity 3, the other extremity 4 being operable by the pressure of a finger of the user. Hook 2 is mounted on slip socket 1 by a spring blade 5 which pivots hook 2 substantially in its centre.

The extremity 6 of the hand piece comprises a longitudinal counter sink 7 in order to allow passage of hook 2 the bent extremity of which 3 catches in a slot 8 under the urging of spring 5. In order to unhook the hand piece, the user bears on extremity 4 of hook 2, which extracts the bent extremity 3 of hook 2 from notch 8 and permits the removal of the hand piece. The drawbacks associated with this hooking device and which have been described above appear clearly on this figure.

Reference is now made to FIGURES 2 to 5 which describe the slip socket of the wrist joint for a hooking device according to the invention. The slip socket 9 of wrist joint 10 includes a male stud member and has axially extending spring means shown as a spring blade 11 extending along the entire length of socket 9. Spring 11 has at one extremity thereof a ring 12 secured around a recessed portion of the socket 9 and at its other extremity a depressed section 13. The socket is suitably recessed to accommodate the depressed section of the spring. Near the depressed section 13 is an outwardly projecting stub 14 having an inclined face 14a on the side toward the ring 12.

The slip socket comprises at its free extremity 15 an annular groove 16 on which is force-fitted ring 12 of spring 11. The slip socket comprises furthermore a longitudinal groove 17 in which spring 11 is free to move. The stop depressed section 13 of spring 11 is engageable by a pusher button 18 which by pressure causes the entry of spring 11 in groove 17 and the lowering of stub 14.

The rear socket 19 of the hand piece has a cylindrical bore 20 which has a diameter slightly greater than that of socket 9. Bore 20 has near its free extremity 21 internally recessed means shown as an annular groove 22.

The hand piece is slipped on socket 9 without prior positioning, the catching of stub 14 in the annular groove 22 under the action of spring 11 serving to retain the hand piece. Pressure on button 18 causes the lowering of stub 14 and permits the freeing of the hand piece.

There is thus provided a hooking device which is of ease to use since the assembly is made without prior positioning the hand piece with the respect to the driving device. The hand piece can be turned freely on its support, stub 14 being able to occupy any position in groove 22. It is to be noted that the considerable length of the blade forming spring 11 and the fact that the displacement of this blade is limited, avoid all danger of the spring breaking.

The device according to the invention can be used for the assembly of a dental piece on a classical wrist joint as well as for the direct coupling of a hand piece on a small motor.

The invention extends also to instruments for dental surgery provided with coupling devices according to the invention, more particularly to hand pieces comprising a socket such as described previously and wrist joints or small driving motors comprising a slip socket such as described and shown.

Although the invention has been described with respect to one particular embodiment thereof, it will be understood that the same is in no way limited thereto and that there may be brought various modifications in detail and form without departing from the spirit and scope of the invention.

What is claimed is:

1. In a dental handpiece assembly, a handpiece having internally recessed means therein at one end thereof, a slip socket including a male stud member connected to driving means and adapted to fit in said end of said handpiece, said socket having axially extending spring means recessed in said male member and fitting inside said handpiece, a radially outwardly projecting catch stub adjacent one end of said spring means for engaging with said recessed means in said handpiece and thereby preventing axial movement between said handpiece and said socket, and a radially displaceable push button mounted on said socket adjacent said male member in contact with said spring means for depressing said spring means to disengage said catch stub from said recessed means and thereby permit disconnecting said socket from said handpiece.

2. Assembly according to claim 1, wherein said recessed means in said handpiece comprises an inner annular groove.

3. Assembly according to claim 1, wherein said spring means includes a ring at the other end thereof and said socket has an annular recessed portion around which said ring is secured.

4. Assembly according to claim 2, wherein said spring means extends for substantially the entire length of said socket and terminates at its extremity opposite said ring in a depressed section, said socket being recessed to accommodate said depressed section, said push button being engageable with said depressed section to force said spring means inwardly to release said catch stub from said groove.

References Cited

UNITED STATES PATENTS 2,212,679   8/1940   White _____ 285–317
2,941,822   6/1960   Moecker _____ 285–317

CARL W. TOMLIN, *Primary Examiner.*

A. V. KUNDRAT, *Assistant Examiner.*

U.S. Cl. X.R.

285—7